US 6,556,580 B1

United States Patent
Wang et al.

(10) Patent No.: US 6,556,580 B1
(45) Date of Patent: Apr. 29, 2003

(54) MULTI-FUNCTION TRANSMIT PACKET BUFFER

(75) Inventors: Chi-Lie Wang, Sunnyvale, CA (US); Lai-Chin Lo, Campbell, CA (US); Ngo Thanh Ho, San Jose, CA (US); Krishna Uppunda, Santa Clara, CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/465,984

(22) Filed: Dec. 16, 1999

(51) Int. Cl.[7] .............................. H04L 12/56; H04J 3/02
(52) U.S. Cl. ...................... 370/412; 370/462; 713/2; 709/250
(58) Field of Search .................. 370/235, 252, 370/461–463, 412, 417, 445, 447, 467, 468; 710/52, 56, 130; 711/100; 709/224, 227, 220, 250; 713/323, 300, 2

(56) References Cited

U.S. PATENT DOCUMENTS 6,065,121 A * 5/2000 Hobson et al. ............. 713/300
6,128,715 A * 10/2000 Wang et al. ................ 711/168
6,405,320 B1 * 6/2002 Lee et al. ................... 713/300

OTHER PUBLICATIONS

"3Com® 10/100 Mbps Desktop Network Interface Cards", product specification guide, 3Com Corporation, Santa Clara, CA, copyright 199, 6 pages.

Toigo, J.W., "Neat NICs", *Solutions Integrator*, vol. 3, No. 4, Apr. 1999, Enabling the New Enterprise, 5 pages.
"DynamicAccess® Technology—Increasing Network Availability, Performance, Ease of Use, and Manageability", technology/service guide, 3Com Corporation, Santa Clara, CA, copyright 199, 3 pages.
"The New 3Com Fast EtherLink® XL PCI For Complete PC Management", product specification guide, 3Com Corporatin, Santa Clara, CA, copyright 1999, 1 page.
"DynamicAccess® Managed PC Solutions—Lower the cost of PC ownership with Desktop Management Interface (DMI 2.0s)", product specification guide, 3Com Corp., Santa Clara, CA, copyright 1999, 2 pgs.

(List continued on next page.)

*Primary Examiner*—Huy D. Vu
*Assistant Examiner*—Duc Ho
(74) *Attorney, Agent, or Firm*—McDonnell Boehnen Hulbert & Berghoff (57) ABSTRACT

A transmit packet buffer (TPB) is used on a network interface card (NIC) to store downloaded packets and forward them through the media access controller (MAC) and the physical layer interface (PHY) onto the wire. A multi-function TPB is implemented to allow the multiple usage of this buffer. Packets may be downloaded to this buffer through multiple sources. Different types of the packets may each be stored at predefined locations. For example, while the second half of the TPB is used to transmit keep-alive or alert-on-LAN packets, the first half may be used to compare received packets with a wake-up pattern for system wake-up. With multi-function support, various PC management functions may be implemented more effectively and with reduced cost.

20 Claims, 9 Drawing Sheets

OTHER PUBLICATIONS

"DynamicAccess® Managed PC Solutions—Now you can wake up PCs from a central management station", product specification guide, 3Com Corp., Santa Clara, CA, copyright 1999, 1 pg.

"Desktop Management—Centralized Control Across Distributed Systems", technology/services guide, 3Com Corp., Santa Clara, CA, copyright 1999, 11 pgs.

"3Com Managed PC Solutions—Lowering Total Cost of PC Ownership", technology/services gide, 3Com Corp., Santa Clara, CA, copyright 1999, 5 pgs.

"Introducing the 3CR990–TX–97 10/100 PCI NIC with 3XP processor", product specification guide, 3Com Corp., Santa Clara, CA, copyright 1999, 4 pgs.

"10/100 Mbps Fast Ethernet PCI Network Interface Card 100 Mbps Performance Benchmark Comparison", LANQuest, Fremont, CA, Jan. 1998, 4 pages.

"3Com® Eliminates Network Problem 'Finger Pointing'", news and events, 3Com Corporation, Santa Clara, CA, Jun. 1999, 3 pages.

* cited by examiner

MULTI-FUNCTION TRANSMIT PACKET BUFFER

CROSS-REFERENCE TO RELATED APPLICATIONS

The present application is related to copending U.S. patent application Ser. No. 09/451,636, filed Nov. 30, 1999, entitled Method and Apparatus for Using Serial Bus for PC Management; and U.S. patent application Ser. No. 09/451,485, filed Nov. 30, 1999, entitled Method and Apparatus for NIC Resources Without Main Power. Each of the above-cited applications is incorporated herein by reference in its entirety.

BACKGROUND OF THE INVENTION

1. Field of the Invention

The present invention relates to a multi-function transmit packet buffer. More particularly, the present invention relates to a multi-function transmit packet buffer which allows wake-up patterns to be stored in a first portion of the transmit packet buffer and keep-alive and alert-on-LAN packets to be stored in a second portion of the transmit packet buffer. The first portion can be used for pattern matching to wake up the system, while the second portion simultaneously can be used to send out keep-alive and alert-on-LAN packets.

2. Description of Related Art

Current network interface cards (NICs) are unable to download packets through sources other than a PCI bus. This limits the ability to manage the PC remotely over a network through the NIC.

Current NICs use the transmit packet buffer (TPB) to store wake-up patterns. Current NICs cannot use the same TPB to also store and send out keep-alive and alert-on-LAN packets. Current NICs use separate resources to send out keep-alive and alert-on-LAN packets over a network. This increases the complexity and cost of the NIC.

What is needed is a transmit packet buffer which allows packet downloading through multiple sources including a PCI bus, a flex EEPROM, and a serial bus. What is also needed is a transmit packet buffer which eliminates the need for separate resources to send out keep-alive and alert-on-LAN packets over a network.

SUMMARY OF THE INVENTION

The present invention is directed towards a network interface card. The network interface card comprises a multiplex control for controlling downloading of a wake-up pattern and a keep-alive packet from at least one of a plurality of sources into a first and second predefined locations, respectively, in a transmit packet buffer, a wake-up read control for controlling reading out of the wake-up pattern from the first predefined location, and a keep-alive read control for controlling reading out of the keep-alive packet from the second predefined location. The network interface card also comprises an arbiter for controlling the wake-up and keep-alive read controls, the arbiter capable of allowing the transmit packet buffer to transmit the wake-up pattern to a comparator substantially in parallel with transmitting the keep-alive packet to a network, the comparator capable of comparing the wake-up pattern from the transmit packet buffer with received packets from the network and generating a wake-up signal to a host when a match is found.

DETAILED DESCRIPTION OF THE INVENTION

The multi-function transmit packet buffer (TPB) of the present invention allows packet downloading through multiple sources such as a PCI bus, a flex EEPROM, and a serial bus. It also allows different type of packets to be downloaded into the TPB at predefined locations instead of being sequentially stored, supports sending out keep-alive and alert-on-LAN packets from one portion of the TPB and comparing received packets with a pre-stored pattern from another portion of the TPB in parallel, and reduces the cost of the network interface card by eliminating the need for multiple resources to support multiple functions.

Figure 1:
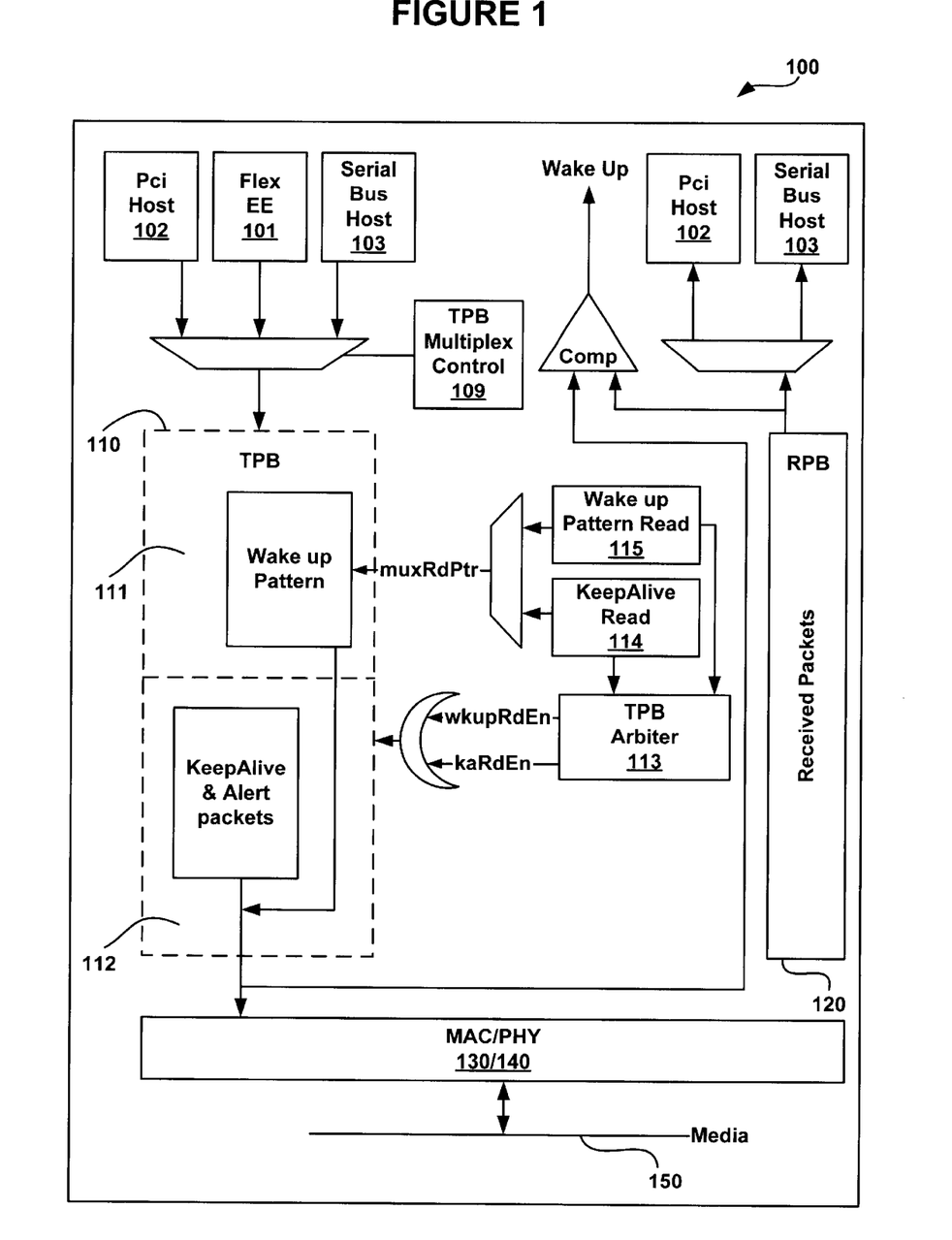
FIG. 1 shows one embodiment of a network interface card having a multi-function transmit packet buffer of the present invention.

FIG. 1 shows one embodiment of a network interface card having a multi-function transmit packet buffer of the present invention. A NIC (network interface card) 100 is used to connect PCs to a network and provide a communication path to pass messages. NIC 100 may be connected to one or more hosts through one or more buses. In this example, NIC 100 is connected to a flex EEPROM 101, a PCI (peripheral component interconnect) host 102, and a serial host 103. On the transmit side, packets are downloaded through from flex EEPROm 101, PCI host 102, and/or serial host 103 to a TPB (transmit packet buffer) 110. The packets are then forwarded to a MAC (media access controller) 130, which converts the packets to conform with a networking protocol such as IEEE 802.3 Data Link layer protocol. The packets are then sent through a PHY (physical layer interface) 140 and transmitted onto media 150. On the receive side, packets being received from media 150 go through PHY 140 and MAC 130 before getting written into a RPB (receive packet buffer) 120. The packets are then uploaded through PCI host 102 to the host memory.

The PCI interface for PCI host 102 may include a PCI slave and PCI master. The function of the PCI slave is to determine whether to accept a transaction initiated by PCI host 102. This transaction may be used to initialize NIC registers, check status, handle interrupts, and control data movement. The function of the PCI master is to download packets to be transmitted and upload packets being received through PCI host 102. Each packet consists of multiple fragments and each fragment can be located in different chunks of the host memory. Data downloading is started by fetching the address and the length information of each fragment, followed by downloading the packet data from the host memory to TPB 110. This process repeats until all the fragments within a packet and all the packets are downloaded. Data uploading is handled the same way as data downloading except the direction of the data is reversed. Instead of downloading packet data from the host memory to TPB 110, data will be uploaded from RPB 120 to the host memory.

In order to save power, the PC may be powered down after some period of non-use, or as instructed by the user. The main power may be removed to minimize the power consumption. As the result, PCI power and the PCI clock may be turned off. If NIC 100 is acting as a wake-up device, an auxiliary power with a constantly running ASIC clock may be provided to the PCI clock domain functional blocks. This scheme will allow the resources of NIC 100 to be accessed through an alternate path. Keep-alive packets may be sent out to refresh the presence of NIC 100 in the router's routing table, which will prevent NIC 100 from dropping out of the network. Alert-on-LAN packets may also be transmitted to report any encountered abnormal conditions. Finally, either receiving a wake-up event or restarting the PC will restore main power and allow the PC to return to normal operation mode.

In order to support various PC management functions, multiple sources are allowed to download transmit packets to TPB 110. One source is a flex EEPROM 101. Normally after power-up or reset, the registers of NIC 100 may be initialized by flex EEPROM 101. The keep-alive and alert-on-LAN packets may also be loaded accordingly. The packet download operation may be completed with the assertion of an initialization complete signal. Other sources may not access TPB 110 until the loading of flex EEPROM 101 is completed. PCI host 102 may also download transmit packets to TPB 110 while PCI host 102 is in normal operation mode. Serial host 103 may also download transmit packets to TPB 110. When the PC is powered down, neither PCI power nor the PCI clock may be available. Serial host 103 may be used as a secondary management bus to download keep-alive and alert-on-LAN packets for PC management functions. A scheme is implemented to allow downloading and reading out wake-up patterns, keep-alive packets, and alert-on-LAN packets through each of the multiple sources without any contention. This scheme makes use of a TPB multiplex control 109.

Figure 2:
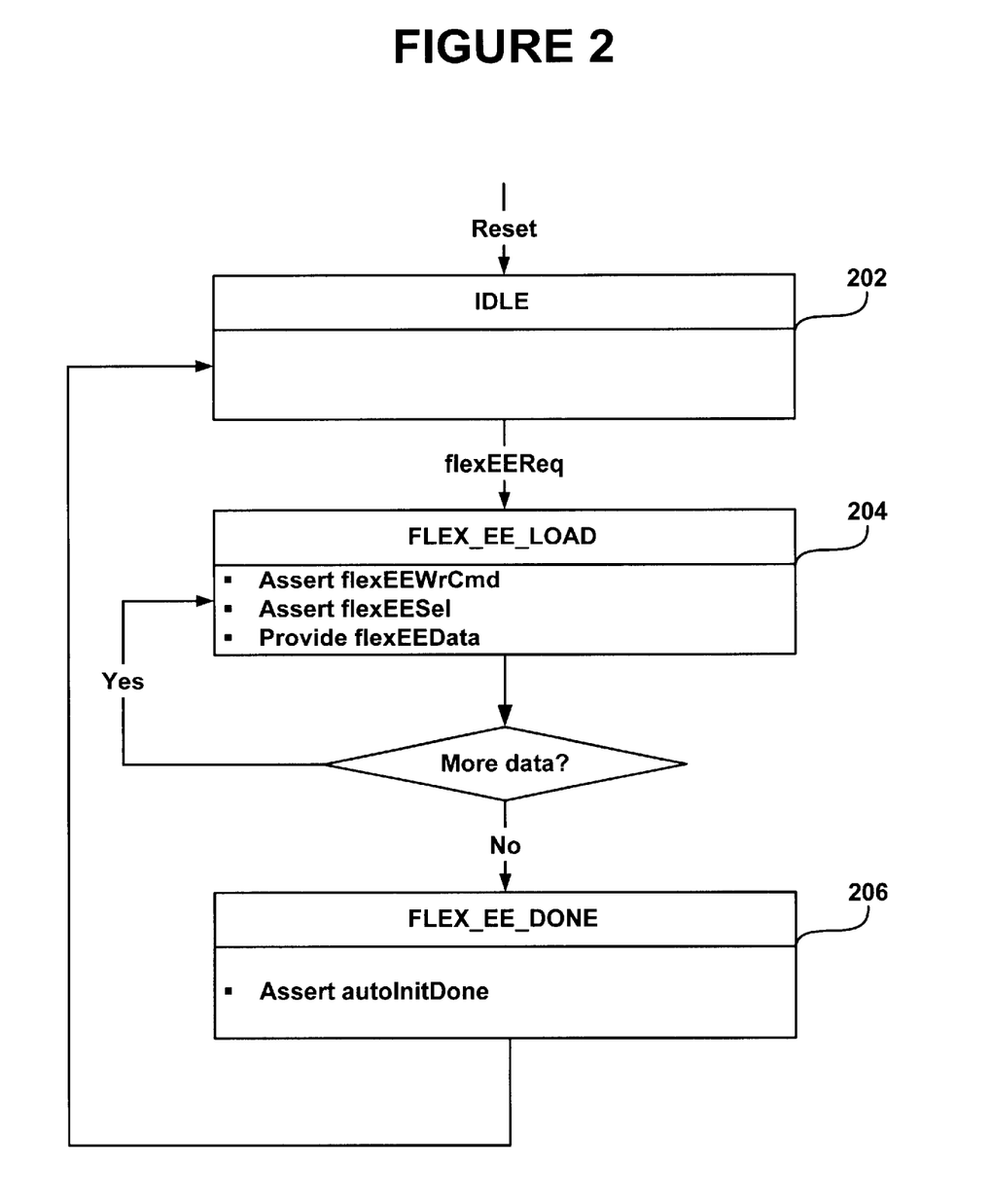
FIG. 2 shows one embodiment of a state diagram for downloading packets through a flex EEPROM.

FIG. 2 shows one embodiment of a state diagram for downloading packets through a flex EEPROM. After a power-up or reset, TPB multiplex control 109 enters an idle state (202). From idle state (202), TPB multiplex control 109 may receive a flex EEPROM download request (flexEEReq) and enter a flex EEPROM download state (FLEX_EE_LOAD) (204). In flex EEPROM download state (204), TPB multiplex control 109 asserts a write command (flexEEWrCmd) to TPB 110, asserts a multiplex command (flexEESel) to multiplex the data from flex EEPROM 101 to TPB 110, and provides the flex EEPROM data (flexEEData) to TPB 110. The commands in the flexEEPROM download state (204) are repeated until all of the packets in flex EEPROM 101 are downloaded to TPB 110. When all of the packets have been downloaded to TPB 110, TPB multiplex control 109 enters into a done state (FLEX_EE_DONE) (206), where TPB multiplex control 109 asserts a done signal (autoInitDone) and returns to idle state (202).

Figure 3:
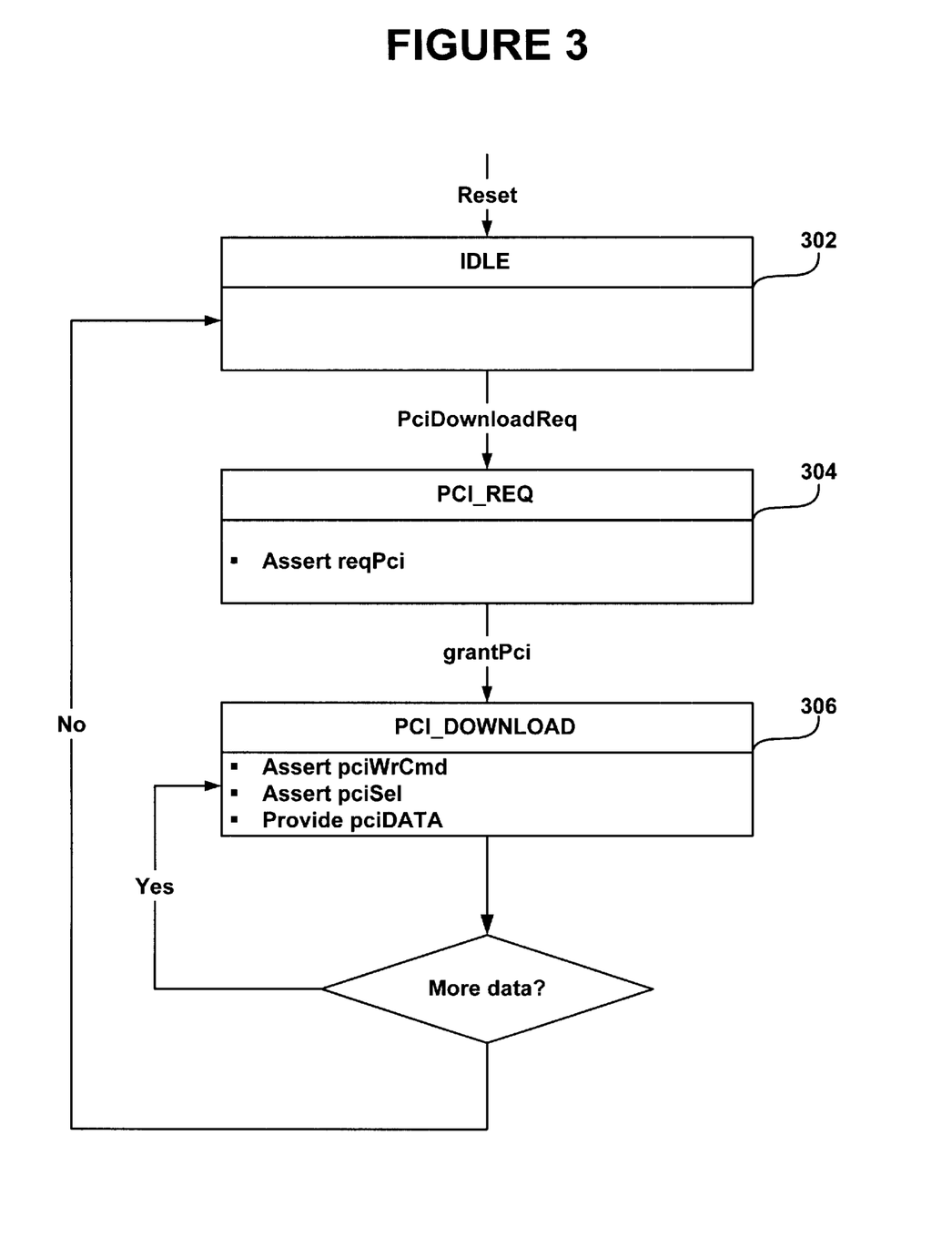
FIG. 3 shows one embodiment of a state diagram for downloading packets through a PCI bus.

FIG. 3 shows one embodiment of a state diagram for downloading packets through a PCI bus. Downloading through PCI bus 102' may take place only while the PC is in normal operating mode. Downloading through PCI bus 102' may be started only after flex EEPROM downloading is complete, which may be indicated by the done signal (autoInitDone).

After a reset, TPB multiplex control 109 enters an idle state (302). From idle state (302), TPB multiplex control 109 may receive a PCI download request (PciDownloadReq) from the PCI host and enter a PCI request state (PCI_REQ) (304). In PCI request state (304), TPB multiplex control 109 asserts a PCI request (reqPCI) to the PCI arbiter to request ownership of PCI bus 102'. When TPB multiplex control 109 receives a PCI grant (grantPCI) from the PCI arbiter, TPB multiplex control 109 enters a PCI download state (PCI_DOWNLOAD) (306). In PCI download state (306), TPB multiplex control 109 asserts a write command (pciWrCmd) to TPB 110, asserts a multiplex command (pciSel) to multiplex the data from PCI bus 102' to TPB 110, and provides the PCI data (pciDATA) to TPB 110. The commands in the PCI download state (306) may be repeated in a series of burst transactions until all of the packets from PCI bus 102' which should be downloaded are downloaded to TPB 110. TPB multiplex control 109 then returns to idle state (302).

Figure 4:
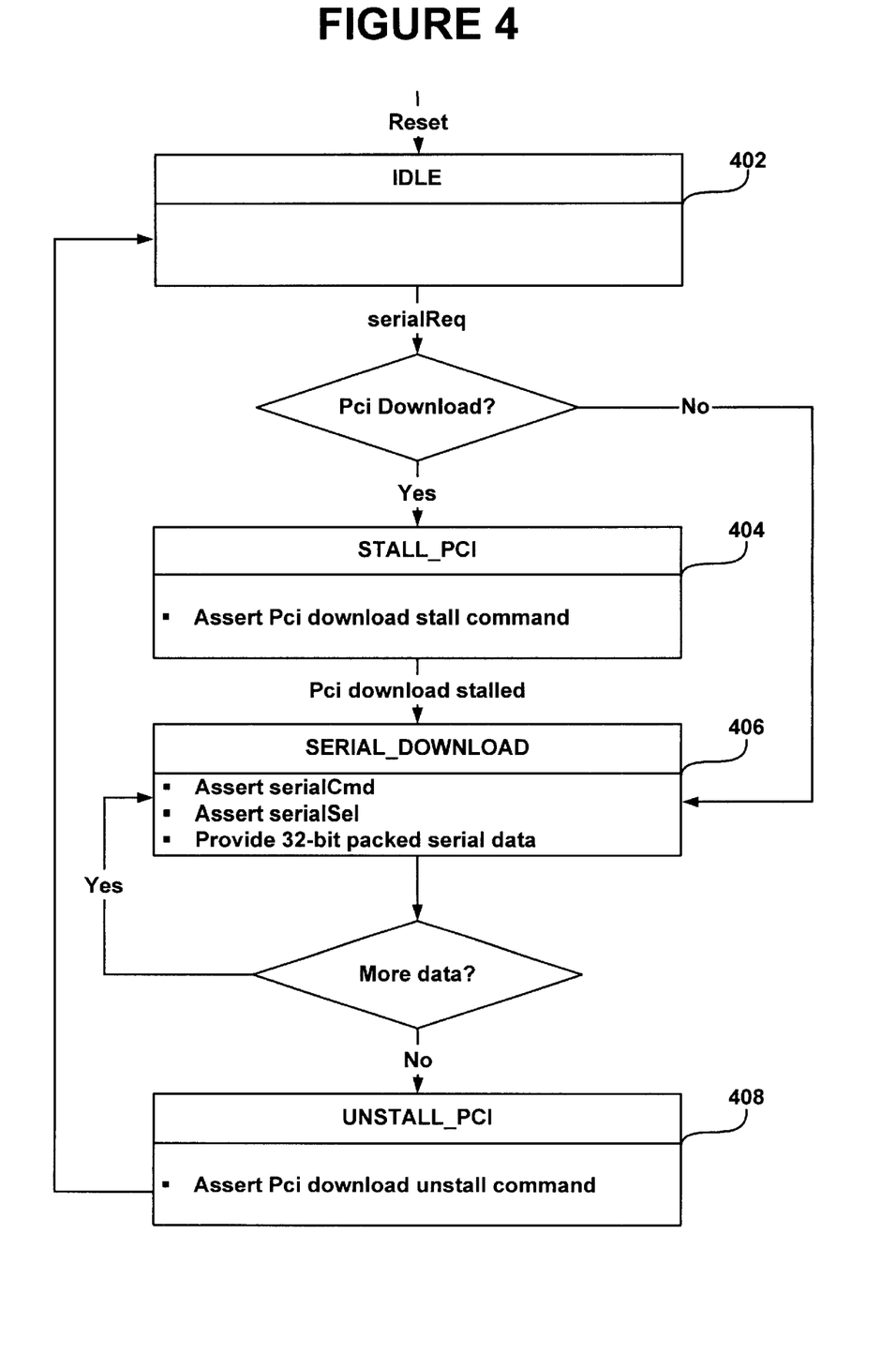
FIG. 4 shows one embodiment of a state diagram for downloading packets through a serial bus.

FIG. 4 shows one embodiment of a state diagram for downloading packets through a serial bus. Downloading through serial bus 103' may be started only after flex EEPROM downloading is complete, which may be indicated by the done signal (autoInitDone). Downloading through serial bus 103' may be started also only when there is no active PCI download in progress, because packet data downloaded to TPB 110 through different sources must be on a per packet basis in order for them to be downloaded properly. TPB multiplex control 109 may therefore stall an active PCI download and then unstall the PCI download after the serial download is complete.

After a reset, TPB multiplex control 109 enters an idle state (402). From idle state (402), TPB multiplex control 109 may receive a serial bus download request (serialReq) from a serial device. TPB multiplex control 109 then checks for a PCI download. If there is an active PCI download, TPB multiplex control 109 enters into a stall PCI state (STALL_PCI) (404) and asserts a PCI download stall command. When TPB multiplex control 109 receives a PCI download stalled signal, indicating that the PCI download has been stalled after finishing a complete packet, TPB multiplex control 109 enters into a serial download state (SERIAL_DOWNLOAD) (406). If there is no active PCI download, TPB multiplex control 109 goes directly to the serial download state (406). In serial download state (406), NIC 100 asserts a serial write command (serialCmd) to TPB 110, asserts a multiplex command (serialSel) to multiplex the data from serial bus 103' to TPB 110, and provides the serial data to TPB 110. The commands in the serial download state (406) are repeated until all of the packets from serial bus 103' are downloaded to TPB 110. TPB multiplex control 109 then enters a unstall PCI state (UNSTALL_PCI) (408) and asserts a PCI download unstall command before returning to idle state (402).

Figure 5:
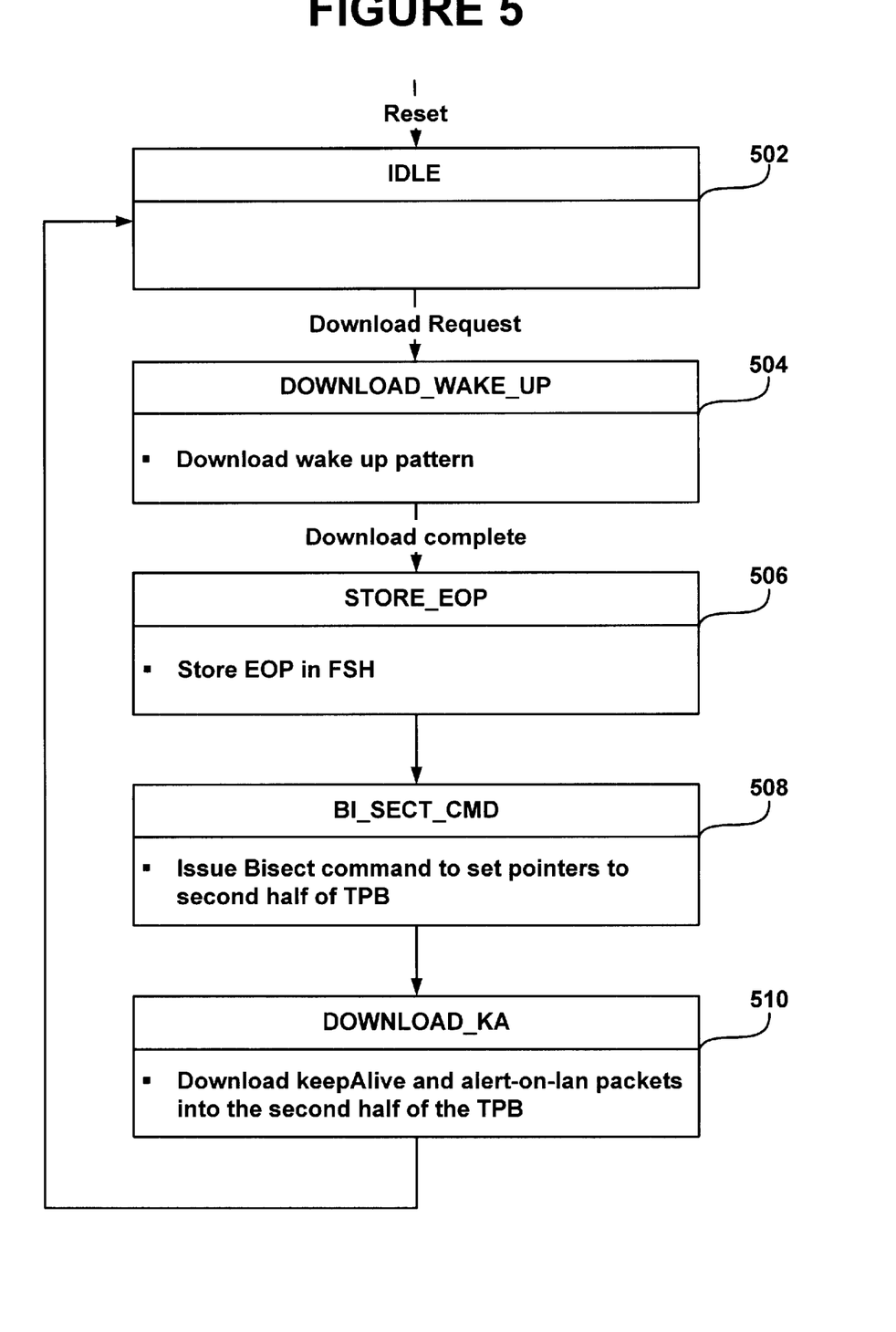
FIG. 5 shows one embodiment of a state diagram for downloading packets to predefined sections of the transmit packet buffer.

FIG. 5 shows one embodiment of a state diagram for downloading packets to predefined sections of the transmit packet buffer. Instead of being sequentially stored in TPB 110, different types of packets may be downloaded into predefined sections of TPB 110. For example, a wake-up pattern may downloaded into a first half 111 of TPB 110, while keep-alive and alert-on-LAN packets may be downloaded into a second half 112 of TPB 110. While the keep-alive and alert-on-LAN packets are transmitted from second half 112 of TPB 110, the wake-up pattern from first half 111 may also be used to compare packets received in RPB 120 to initiate system wake-up. If wake-up pattern is downloaded to first half 111 of TPB 110, the wake-up detection logic needs to know where the wake-up pattern ends within TPB 110 each time the complete patterns are read out. An end-of-pattern (EOP) indication for the wake-up pattern may be used, being stored into a control word called the frame start header (FSH). This word may be attached in front of each pattern to indicate the ending location of each pattern. Each time the patterns stored in TPB 100 are read out, the wake-up detection logic will use the EOP to determine where to end the pattern comparison. For the keep-alive reading out operation, within each keep-alive time interval, all the packets in TPB 100 will be scanned to determine whether they should be transmitted. After scanning through the complete TPB 110, the keep-alive read pointer will be reset to the beginning of the second half 112 of TPB 110. This will allow the process to send out keep-alive and alert-on-LAN packets continuously.

After a reset, TPB multiplex control 109 enters an idle state (502). From idle state (502), TPB multiplex control 109 may receive a download request from the wake-up control and enter a download wake-up pattern state (DOWNLOAD_WAKE_UP) (504). In download wake-up pattern state (504), TPB multiplex control 109 downloads a wake-up pattern into the beginning of TPB 100. TPB multiplex control 109 may receive a download complete signal and then enter into a store end-of-pattern indication state (STORE_EOP) (506), where TPB multiplex control 109 will store an end-of-pattern indication in the frame start header for the wake-up pattern. TPB multiplex control 109 will then enter a bisect command state (BI_SECT_CMD) (508), where a bisect command sets a write pointer to the second half 112 of TPB 110. In download state (DOWNLOAD_KA) (510), TPB multiplex control 109 downloads keep-alive and alert-on-LAN packets into the second half 112 of TPB 110. Although this example uses a bisect command to download keep-alive and alert-on-LAN patterns into the second half 112 of TPB 110, TPB multiplex control 109 may partition TPB 110 in other ways and download these packets into any suitable portion of TPB 110. The wake-up pattern may also be downloaded into any suitable portion of TPB 110 as long as its location is communicated to the wake-up logic.

Figure 6:
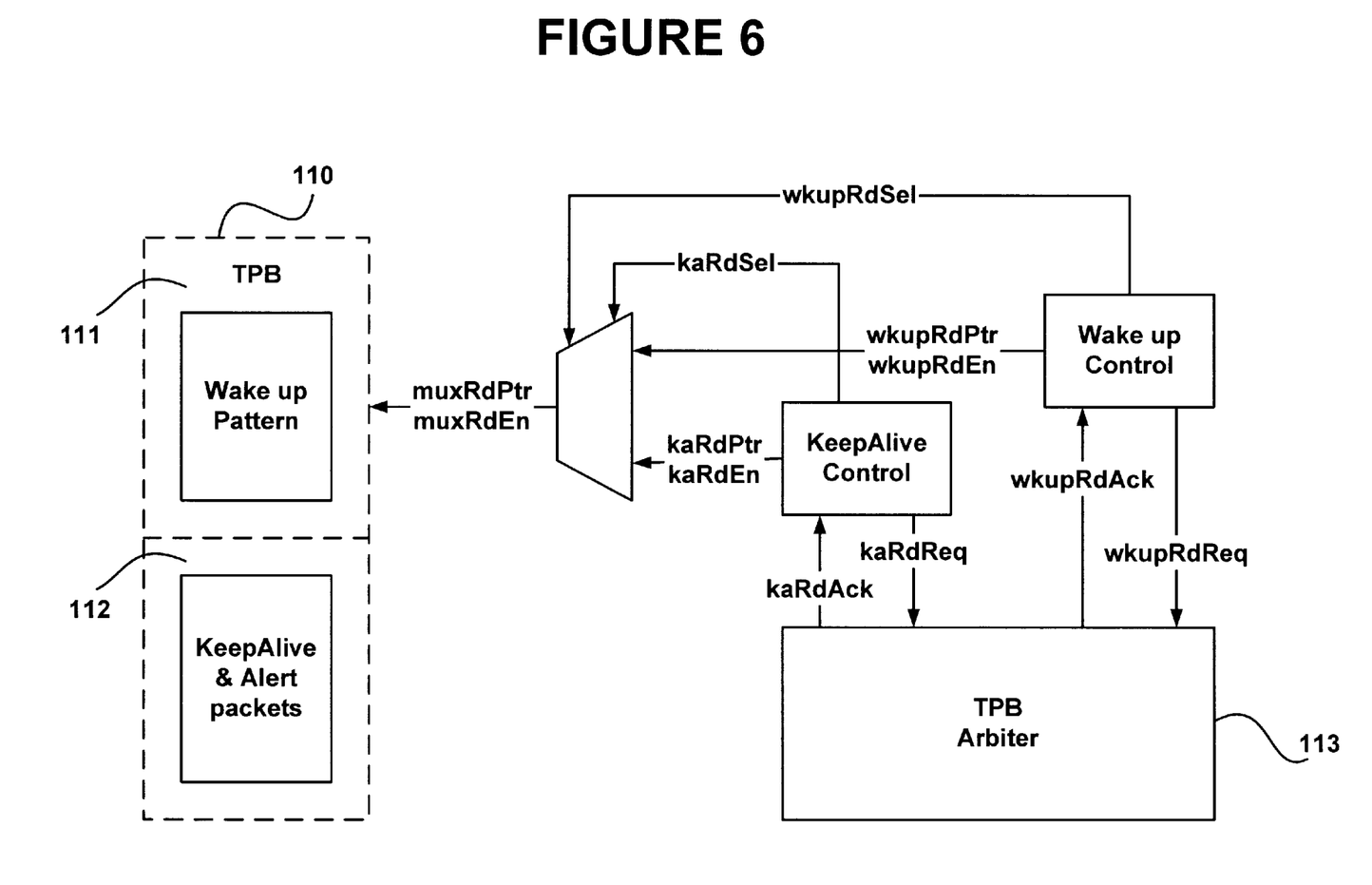
FIG. 6 shows one embodiment of a transmit packet buffer arbiter with a keep-alive read control and wake-up read control.

FIG. 6 shows one embodiment of a transmit packet buffer arbiter with a keep-alive read control and wake-up read control. TPB arbiter 113 controls keep-alive read control 114 and wake-up read control 115. Reading out the wake-up pattern from first half 111 of TPB 110 and comparing it with the received packets for wake-up may be performed in parallel with sending out the keep-alive and alert-on-LAN packets from second half 112 of TPB 110. A duplicated read pointer may be implemented in wake-up read control 115 to allow the parallel operation. In order to prevent simultaneous access, TPB arbiter 113 may use an arbitration scheme to ensure that only one source can read data from TPB 110 at a time.

Keep-alive read control 114 sends a keep-alive read request signal (kaRdReq) to TPB arbiter 113, which responds with a keep-alive read acknowledge signal (kaRdAck). Keep-alive read control 114 then sends a keep-alive read enable signal (kaRdEn) to TPB 110 and a keep-alive read select signal (kaRdSel) to multiplex a keep-alive read pointer (kaRdPtr) to TPB 110. Keep-alive read pointer may point to the second half 112 of TPB 110. Keep-alive read control 114 also generates a keep-alive read pointer increment signal (kaPtrInc) to increment the keep-alive read pointer. This process repeats until all of the data within one packet is read out, and all of the packets are read out. Keep-alive read control 114 will then reset the keep-alive read pointer to the second half 112 of TPB 110.

Wake-up read control 115 operates similarly to keep-alive read control 114. Wake-up read control 115 sends a wake-up read request signal (wkupRdReq) to TPB arbiter 113, which responds with a wake-up read acknowledge signal (wkupRdAck). Wake-up read control 115 then sends a wake-up read enable signal (wkupRdEn) to TPB 110 and a wake-up read select signal (wkupRdSel) to multiplex a wake-up read pointer (wkupRdPtr) to TPB 110. Wake-up read control 115 also generates a wake-up read pointer increment signal (wkupPtrInc) to increment the wake-up read pointer. This process repeats until all of the data within one packet is read out, and all of the packets are read out. If a pattern match is found with packets received in RPB 120, wake-up read control 115 will generate a wake-up event to wake up the system.

Figure 7:
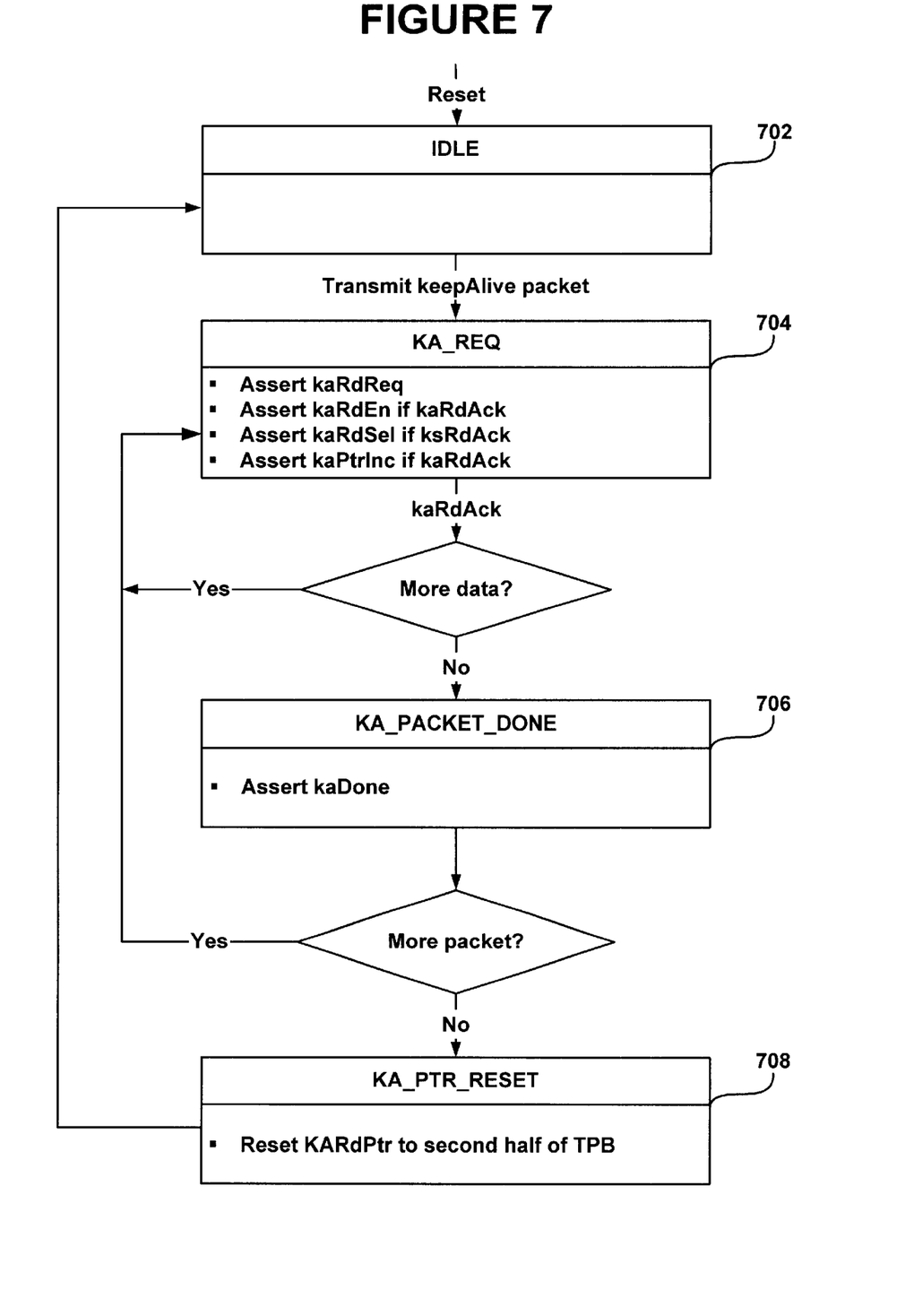
FIG. 7 shows one embodiment of a state diagram for a keep-alive read control.

FIG. 7 shows one embodiment of a state diagram for a keep-alive read control. After a reset, keep-alive read control 114 enters an idle state (702). From idle state (702), keep-alive read control 114 may need to transmit a keep-alive packet, typically at predefined intervals of time. Keep-alive read control 114 then enters a keep-alive request state (KA_REQ) (704) and asserts a keep-alive read request signal (kaRdReq). Keep-alive read control 114 will wait for a keep-alive read acknowledge signal (kaRdAck) from TPB arbiter 113 before asserting a keep-alive read enable signal (kaRdEn), keep-alive read select signal (kaRdSel), and a keep-alive pointer increment signal (kaPtrInc). Keep-alive read control 114 will continue asserting the read request until all of the data in the packet has been read out. Keep-alive read control 114 will then enter a packet done state (KA_PACKET_DONE) (706) and assert a done signal (kaDone). This process repeats until all of the packets are read out. Keep-alive read control 114 then enters a pointer reset state (KA_PTR_RESET) (708) and resets the keep-alive read pointer (kaRdPtr) to the beginning of second half 112 of TPB 110 before returning to idle state (702).

Figure 8:
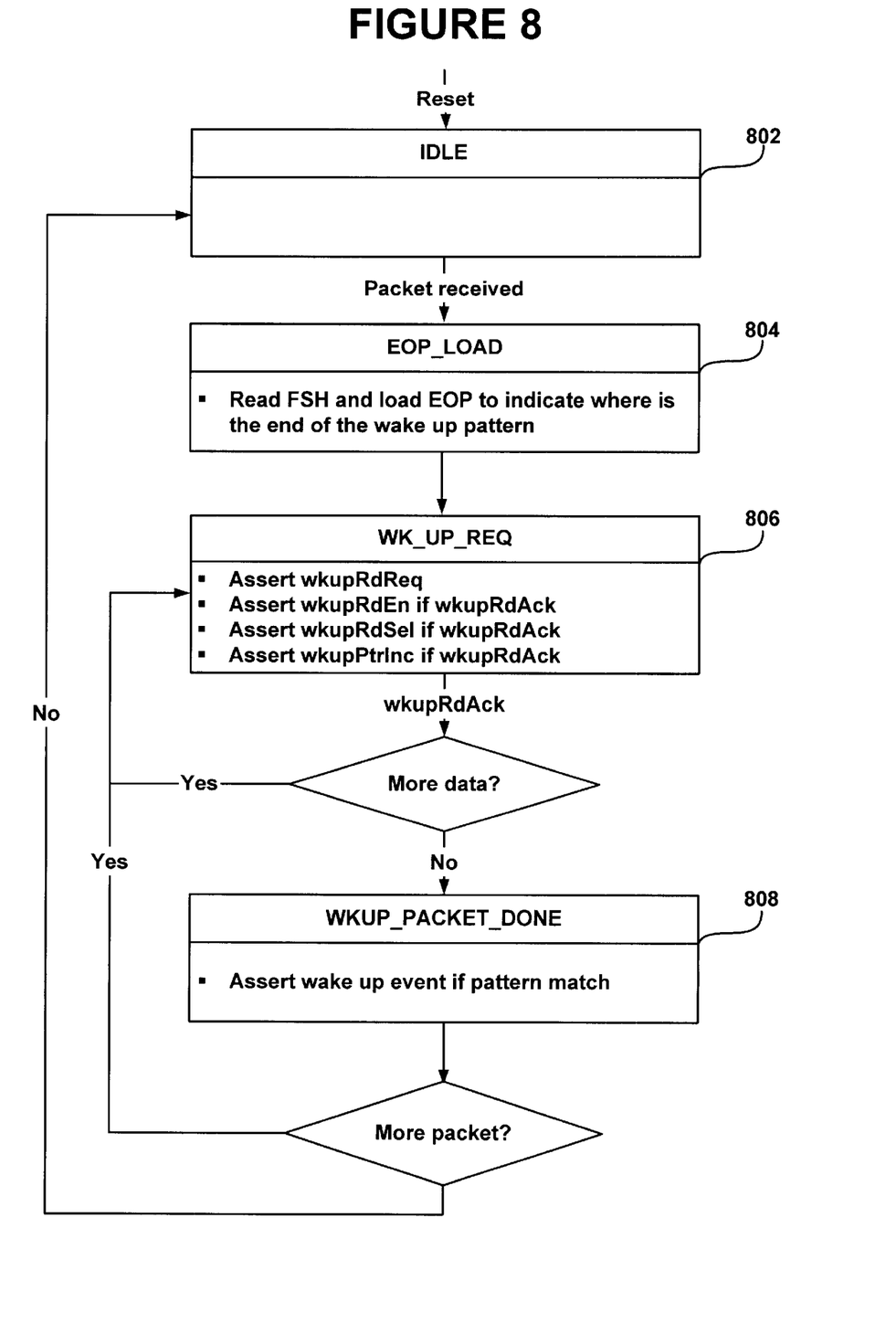
FIG. 8 shows one embodiment of a state diagram for a wake-up read control.

FIG. 8 shows a flow diagram for a wake-up read control. After a reset, wake-up read control 115 enters an idle state (802). When a packet is received in RPB 120, wake-up read control 115 enters an end-of-pattern load state (EOP_LOAD) (804) and reads the FSH and EOP information to find out where the wake-up pattern ends. Wake-up read control 115 then enters a wake-up request state (WK_UP_REQ) (806) and asserts a wake-up read request signal (wkupRdReq). Wake-up read control 115 will wait for a wake-up read acknowledge signal (wkupRdAck) from TPB arbiter 113 before asserting a wake-up read enable signal (wkupRdEn), wake-up read select signal (wkupRdSel), and a wake-up pointer increment signal (wkupPtrInc). Wake-up read control 115 will continue asserting the read request until all of the data in the packet has been read out. Wake-up read control 115 will then enter a packet done state (WKUP_PACKET_DONE) (808) and generate a wake-up event if a pattern match is found with the packets received in RPB 120. This process repeats until all of the packets are read out. Wake-up read control 115 then returns to idle state (802).

Figure 9:
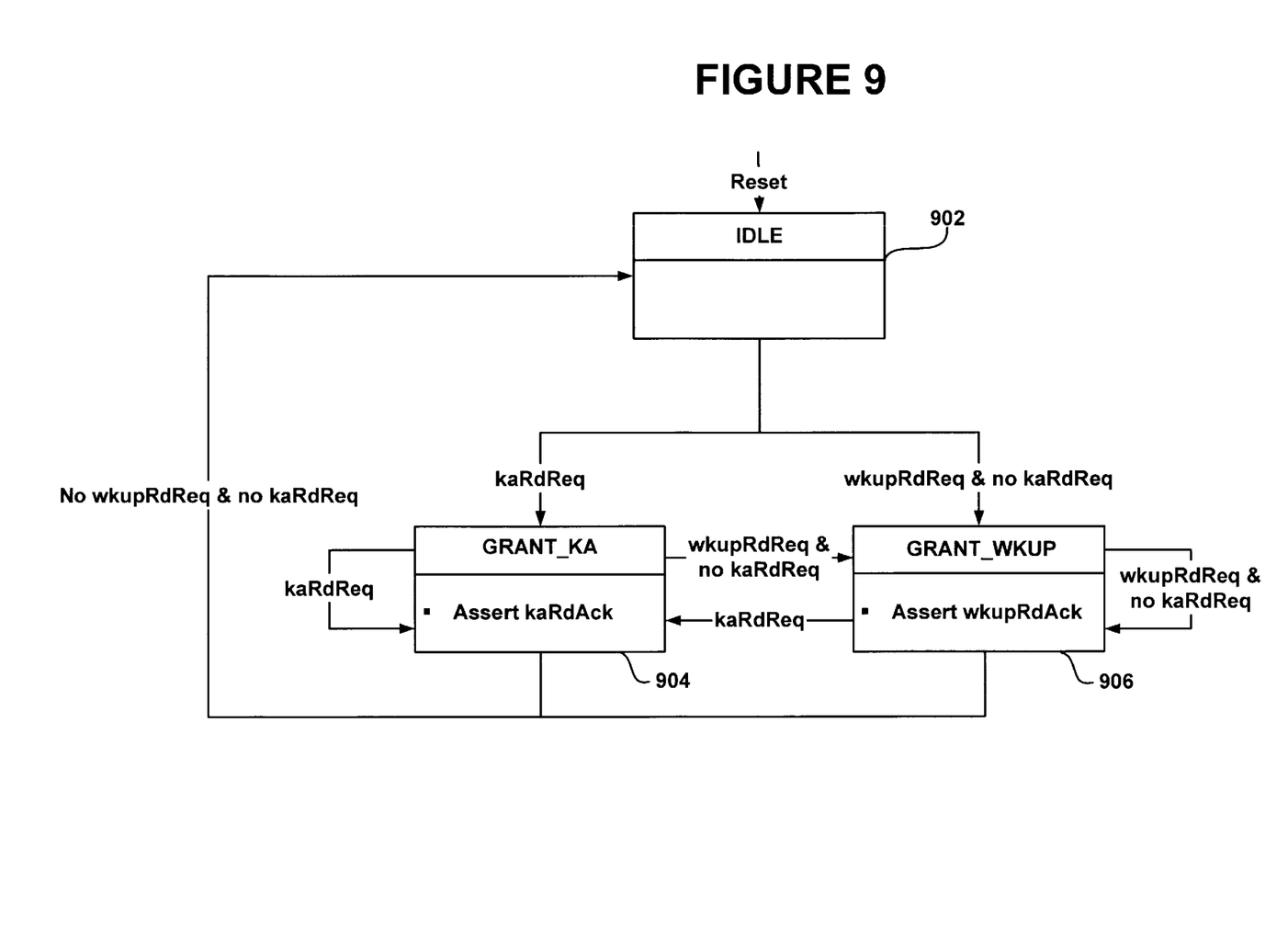
FIG. 9 shows one embodiment of a state diagram for a transmit packet buffer arbiter.

FIG. 9 shows one embodiment of a state diagram for a transmit packet buffer arbiter. TPB arbiter 113 arbitrates the accesses between keep-alive read control 114 and wake-up read control 115. TPB arbiter 113 sends a read acknowledge to the corresponding source. The read enable and the read pointer may be multiplexed into the addressed TPB 110. After the end of the read, the read pointer of the selected source may be incremented to point to the next entry and the arbitration may continue from that point. This arbitration scheme in conjunction with the duplicated read pointer allows two sections of the TPB (one storing keep-alive and alert-on-LAN patterns and another storing a wake-up pattern) to be accessed in parallel.

After reset, TPB arbiter 113 enters an idle state (902). If it receives a keep-alive read request (kaRdReq), TPB arbiter 113 will enter a grant keep-alive state (GRANT_KA) (904) and assert a keep-alive read acknowledge (kaRdAck). If it receives a wake-up read request (wkupRdReq) and there is no keep-alive read request, TPB arbiter 113 will enter a grant wake-up state (GRANT_WKUP) (906) and assert a wake-up read acknowledge (wkupRdAck). In the absence of a keep-alive or wake-up read request, TPB arbiter 113 will return to idle state (902).

The multi-function TPB of the present invention allows various PC management functions to be implemented with a single transmit packet buffer. This approach allows the packets to be downloaded through multiple sources and stored in predefined locations. While the PC is powered down and NIC 100 is power managed, keep-alive and alert-on-LAN packets may be sent out in parallel with the comparison of wake-up pattern through the same TPB 110. Thus multiple advanced PC management functions may be accomplished with reduced cost.

While the invention has been described in terms of some specific examples and in some specific embodiments, it will be clear that this invention is not limited to these specific examples and embodiments and that many changes and modified embodiments will be obvious to those skilled in the art without departing from the true spirit and scope of the invention as defined in the appended claims.

What is claimed is:

1. A network interface card, comprising:
    a multiplex control for controlling downloading of a wake-up pattern and a keep-alive packet from at least one of a plurality of sources into a first and second predefined locations, respectively, in a transmit packet buffer;
    a wake-up read control for controlling reading out of the wake-up pattern from the first predefined location;
    a keep-alive read control for controlling reading out of the keep-alive packet from the second predefined location;
    an arbiter for controlling the wake-up and keep-alive read controls, the arbiter capable of allowing the transmit packet buffer to transmit the wake-up pattern to a comparator substantially in parallel with transmitting the keep-alive packet to a network, the comparator capable of comparing the wake-up pattern from the transmit packet buffer with received packets from the network and generating a wake-up signal to a host when a match is found.

2. The network interface card of claim 1, wherein the plurality of sources include a flex EEPROM.

3. The network interface card of claim 1, wherein the plurality of sources include a PCI host.

4. The network interface card of claim 1, wherein the plurality of sources include a serial host.

5. The network interface card of claim 1, wherein the first predefined location is a first half of the transmit packet buffer.

6. The network interface card of claim 1, wherein the second predefined location is a second half of the transmit packet buffer.

7. The network interface card of claim 1, wherein the first predefined location is at least partially indicated by an end-of-pattern indication stored by the multiplex control in a frame start header associated with the wake-up pattern.

8. The network interface card of claim 1, wherein the first predefined location is at least partially indicated by a pointer generated by the arbiter directed to the beginning of the first predefined location in the transmit packet buffer.

9. The network interface card of claim 1, wherein the second predefined location is at least partially indicated by a pointer generated by the arbiter directed to the beginning of the second predefined location in the transmit packet buffer.

10. The network interface card of claim 1, wherein:
    the arbiter may also control downloading of an alert-on-LAN packet from at least one of a plurality of sources into the second predefined location;
    the keep-alive read control may also control reading out of the alert-on-LAN packet from the second predefined location; and
    the arbiter may also allow the transmit packet buffer to transmit the alert-on-LAN packet to the network substantially in parallel with transmitting the wake-up pattern to a comparator and transmitting the keep-alive packet to the network.

11. A method for using a transmit packet buffer in a network interface card to transmit a wake-up pattern, comprising:
    attaching location information associated with the first and second predefined locations to a wake-up pattern and a keep-alive packet, respectively;
    downloading the wake-up pattern and the keep-alive packet from at least one of a plurality of sources into a first and a second predefined locations in the transmit packet buffer;
    transmitting the wake-up pattern to a comparator substantially in parallel with transmitting the keep-alive packet to a network, the comparator capable of comparing the wake-up pattern from the transmit packet buffer with received packets from the network and generating a wake-up signal to a host when a match is found.

12. The method of claim 11, wherein the plurality of sources include a flex EEPROM.

13. The method of claim 11, wherein the plurality of sources include a PCI host.

14. The method of claim 11, wherein the plurality of sources include a serial host.

15. The method of claim 11, wherein the first predefined location is a first half of the transmit packet buffer.

16. The method of claim 11, wherein the second predefined location is a second half of the transmit packet buffer.

17. The method of claim 11, wherein the first predefined location is at least partially indicated by an end-of-pattern indication stored in a frame start header associated with the wake-up pattern.

18. The method of claim 11, wherein the first predefined location is at least partially indicated by a pointer directed to the beginning of the first predefined location in the transmit packet buffer.

19. The method of claim 11, wherein the second predefined location is at least partially indicated by a pointer directed to the beginning of the second predefined location in the transmit packet buffer.

20. The method of claim 11, further comprising:
attaching location information associated with the second predefined location to an alert-on-LAN packet;
downloading the alert-on-LAN packet from at least one of the plurality of sources into the second predefined location;

transmitting the alert-on-LAN packet to the network substantially in parallel with transmitting the wake-up pattern to a comparator and transmitting the keep-alive packet to the network.

* * * * *